(12) United States Patent
Hayden

(10) Patent No.: US 7,533,195 B2
(45) Date of Patent: May 12, 2009

(54) DMA CONTROLLER FOR DIGITAL SIGNAL PROCESSORS

(75) Inventor: John A. Hayden, Sharon, MA (US)

(73) Assignee: Analog Devices, Inc., Norwood, MA (US)

(*) Notice: Subject to any disclaimer, the term of this patent is extended or adjusted under 35 U.S.C. 154(b) by 793 days.

(21) Appl. No.: 10/786,249

(22) Filed: Feb. 25, 2004

(65) Prior Publication Data
US 2005/0188119 A1 Aug. 25, 2005

(51) Int. Cl.
G06F 13/28 (2006.01)

(52) U.S. Cl. .............. 710/22; 710/29; 710/23; 710/33

(58) Field of Classification Search ............ 710/22, 710/23, 29, 33
See application file for complete search history.

(56) References Cited

U.S. PATENT DOCUMENTS 4,901,234 A * 2/1990 Heath et al. ................ 710/40
5,655,151 A * 8/1997 Bowes et al. ................ 710/22
6,163,836 A * 12/2000 Dowling ..................... 712/37
6,397,324 B1 * 5/2002 Barry et al. ................ 712/225

\* cited by examiner

Primary Examiner—Tariq Hafiz
Assistant Examiner—Jasjit S Vidwan
(74) Attorney, Agent, or Firm—Wolf, Greenfield & Sacks, P.C.

(57) ABSTRACT

A DMA controller includes at least one peripheral DMA channel for handling DMA transfers on a peripheral access bus; at least one memory DMA stream, including a memory destination channel and a memory source channel, for handling DMA transfers on first and second memory access buses; first and second address computation units for computing updated memory addresses for DMA transfers; first and second memory pipelines for supplying memory addresses to the first and second memory access buses, respectively, and for transferring data on the first and second memory access buses; and a multiplexer configured to supply first and second current memory addresses to selected ones of the first and second memory pipelines in response to a control signal.

9 Claims, 12 Drawing Sheets

DMA CONTROLLER FOR DIGITAL SIGNAL PROCESSORS

FIELD OF THE INVENTION

This invention relates to digital processing systems and, more particularly, to methods and apparatus for direct memory access (DMA) in digital processing systems. The DMA methods and apparatus are particularly useful in digital signal processors, but are not limited to such applications.

BACKGROUND OF THE INVENTION

A digital signal computer, or digital signal processor (DSP), is a special purpose computer that is designed to optimize performance for digital signal processing applications, such as, for example, fast Fourier transforms, digital filters, image processing, signal processing in wireless systems, and speech recognition. Digital signal processors are typically characterized by real time operation, high interrupt rates and intensive numeric computations. In addition, digital signal processor applications tend to be intensive in memory access operations and to require the input and output of large quantities of data. Digital signal processor architectures are typically optimized for performing such computations efficiently.

Digital signal processors may include components such as a core processor, a memory, a DMA controller, an external bus interface, and one or more peripheral interfaces on a single chip or substrate. The components of the digital signal processor are interconnected by a bus architecture which produces high performance under desired operating conditions. As used herein, the term "bus" refers to a multiple conductor transmission channel which may be used to carry data of any type (e.g. operands or instructions), addresses and/or control signals. Typically, multiple buses are used to permit the simultaneous transfer of large quantities of data between the components of the digital signal processor. The bus architecture may be configured to provide data to the core processor at a rate sufficient to minimize core processor stalling.

Digital signal processors may utilize direct memory access (DMA) to transfer data from one memory space to another or between a memory space and a peripheral. The core processor can request a DMA data transfer and return to normal processing while the DMA controller carries out the data transfer independent of processor activity. In other cases, a peripheral may request DMA data transfer.

In prior art DMA implementations, prospective DMA clients request exclusive access to DMA resources using a prioritization mechanism. Upon grant, such clients must initiate and complete transfers between peripherals and memory or between memory spaces. A disadvantage of such implementations is that the sum of the lengths of the pipeline for access to DMA resources and the pipeline for access to memory represents overhead. Such implementations often mitigate this overhead by adding the complexity of DMA bus bursts under hardware or software control.

In prior art DMA implementations, DMA Channel controllers communicate to memory through either a single pipeline serving all memories, or communicate to more than one memory through fixed pipelines which assign specific channels to specific memory pipelines. For a first example, a prior art DMA controller uses a single DMA memory access bus with a single pipeline for all memory accesses; this implementation cannot support independent fast accesses to internal memory and slow accesses to external memory at the same time.

For a second example, a prior art DMA controller for communicating between internal and external memory has a specific channel controller dedicated to the internal access and another for the external access, each with its own pipeline. This implementation does not support unrestricted operation where the source may be either internal or external and the destination may independently be internal or external.

In prior art DMA implementations, DMA controllers provide a static priority assignment among channels. Such implementations cannot dynamically respond to transitory real-time transfer demands caused by congestion delays, and therefore the system designer must reduce the overall system DMA bandwidth budget (and hence system performance) to eliminate the risk of momentary DMA failure.

All of the prior art DMA controllers have had one or more drawbacks, including but not limited to high latency in servicing DMA requests and excessive complexity. Accordingly, there is a need for improved methods and apparatus for direct memory access.

SUMMARY OF THE INVENTION

According to a first aspect of the invention, a DMA controller is provided. The DMA controller comprises at least one peripheral channel for handling DMA transfers on a peripheral access bus, at least one DMA memory stream, including a memory destination channel and a memory source channel, for handling DMA transfers on first and second memory access buses; first and second address computation units for computing updated memory addresses for memory transfers; first and second memory pipelines for supplying memory addresses to the first and second memory access buses, and for transferring data on the first and second memory access buses; and a multiplexer configured to supply first and second memory addresses to selected ones of the first and second memory pipelines in response to a control signal.

According to a second aspect of the invention, a DMA controller is provided. The DMA controller comprises a plurality of DMA channels, each having associated therewith a register file for holding DMA parameters, at least selected ones of said DMA channels including a data FIFO; a peripheral bus interface for coupling the DMA channels to a peripheral access bus; a peripheral prioritizer for prioritizing DMA requests for access to the peripheral access bus; a memory bus interface for interfacing the DMA channels to at least one memory access bus; and a memory prioritizer for prioritizing DMA requests for access to the memory access bus.

According to a third aspect of the invention, a DMA controller is provided. The DMA controller comprises a plurality of DMA channels, each including a datapath for transferring data from a DMA source to a DMA destination and a control circuit for controlling data transfer through the respective datapath in response to DMA parameters; and a prioritizer configured to arbitrate among DMA requests, the prioritizer configured to increase the priority of a memory transfer when a peripheral DMA request is received and a corresponding peripheral DMA channel is not ready to transfer data.

According to a fourth aspect of the invention, a method for DMA transfer is provided. The method comprises providing a plurality of DMA channels, each including a datapath for transferring data from a DMA source to a DMA destination and a control circuit for controlling data transfer through the respective datapath in response to DMA parameters; arbitrating among DMA requests according to a priority associated with each of the DMA channels; and increasing the priority of a memory transfer when a peripheral DMA request is received and a corresponding peripheral DMA channel is not ready to transfer data.

According to a fifth aspect of the invention, a DMA controller is provided. The DMA controller comprises a plurality of DMA channels, each including a datapath for transferring data from a DMA source to a DMA destination on an access bus and a control circuit for controlling data transfer through the respective datapath in response to DMA parameters; and a prioritizer configured to arbitrate among DMA requests, the prioritizer configured to give preference to consecutive transfers on the access bus in one direction.

According to the sixth aspect of the invention, a method for DMA transfer is provided. The method comprises providing a plurality of DMA channels, each including a datapath for transferring data from a DMA source to a DMA destination on an access bus and a control circuit for controlling data transfer through the respective datapath in response to DMA parameters; arbitrating among DMA requests; and giving preference to DMA requests corresponding to consecutive transfers on the access bus in one direction.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
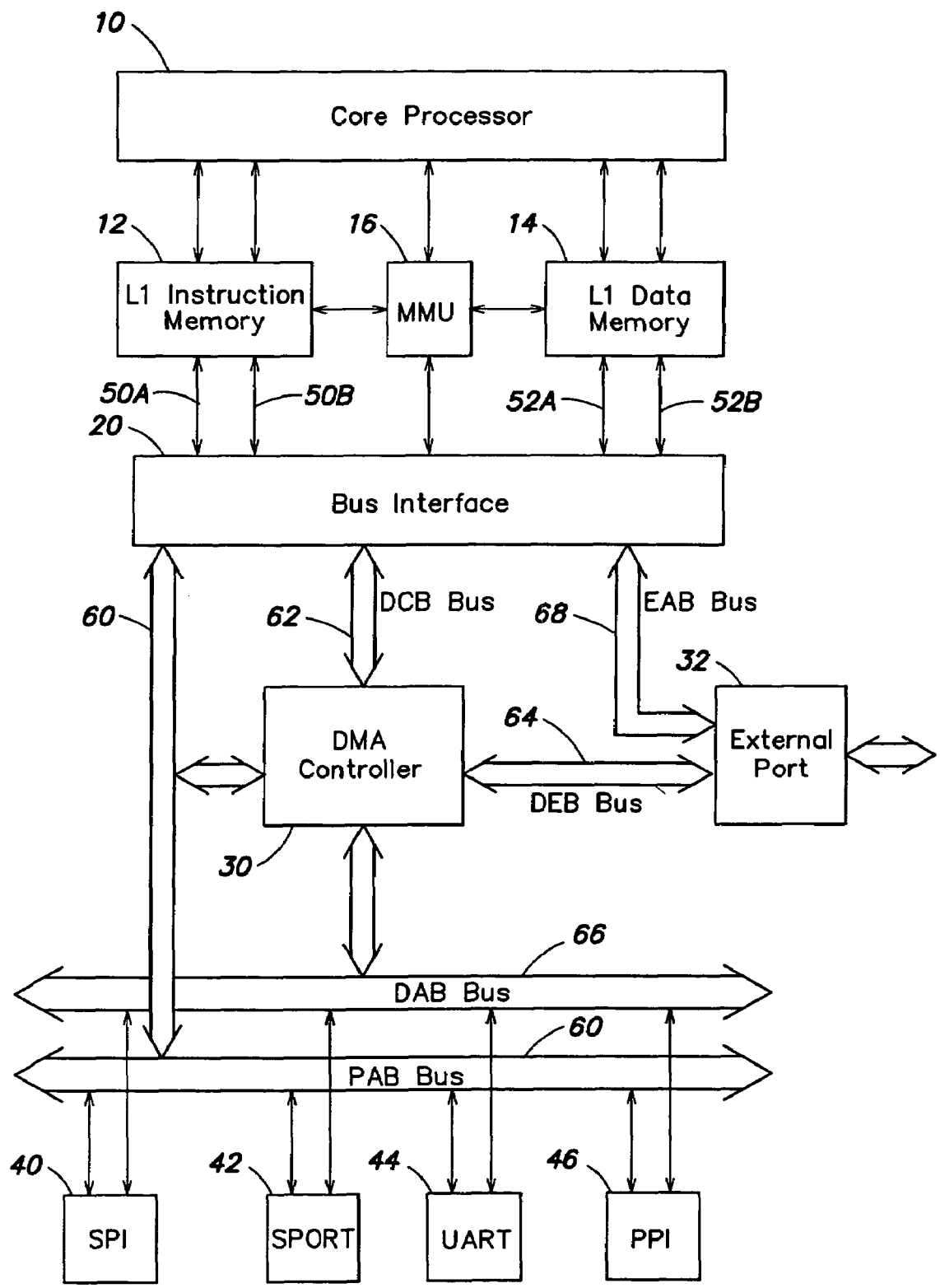
FIG. 1 is a block diagram of a digital signal processor in accordance with an embodiment of the invention.

A block diagram of a digital signal processor in accordance with an embodiment of the invention is shown in FIG. 1. The digital signal processor (DSP) includes a core processor 10, a leveL1 (L1) instruction memory 12, an L1 data memory 14, a memory management unit (MMU) 16 and a bus interface unit 20. In some embodiments, L1 instruction memory 12 may be configured as RAM or as instruction cache and L1 data memory 14 may be configured as RAM or as data cache. The DSP further includes a DMA controller 30, an external port 32 and one or more peripheral ports. In the embodiment of FIG. 1, the DSP includes a serial peripheral interface (SPI) port 40, a serial port (SPORT) 42, a UART port 44 and a parallel peripheral interface (PPI) port 46. The digital signal processor may include additional peripheral ports and other components within the scope of the invention. For example, the digital signal processor may include on-chip L2 memory.

Bus interface unit 20 is connected to L1 instruction memory 12 by buses 50A and 50B and is connected to L1 data memory 14 by buses 52A and 52B. A peripheral access bus (PAB) 60 interconnects bus interface unit 20, DMA controller 30 and peripheral ports 40, 42, 44 and 46. A DMA core bus (DCB) interconnects bus interface unit 20 and DMA controller 30. A DMA external bus (DEB) 64 interconnects DMA controller 30 and external port 32. A DMA access bus (DAB) 66 interconnects DMA controller 30 and peripheral ports 40, 42, 44 and 46. An external access bus (EAB) 68 interconnects bus interface unit 20 and external port 32.

Figure 2:
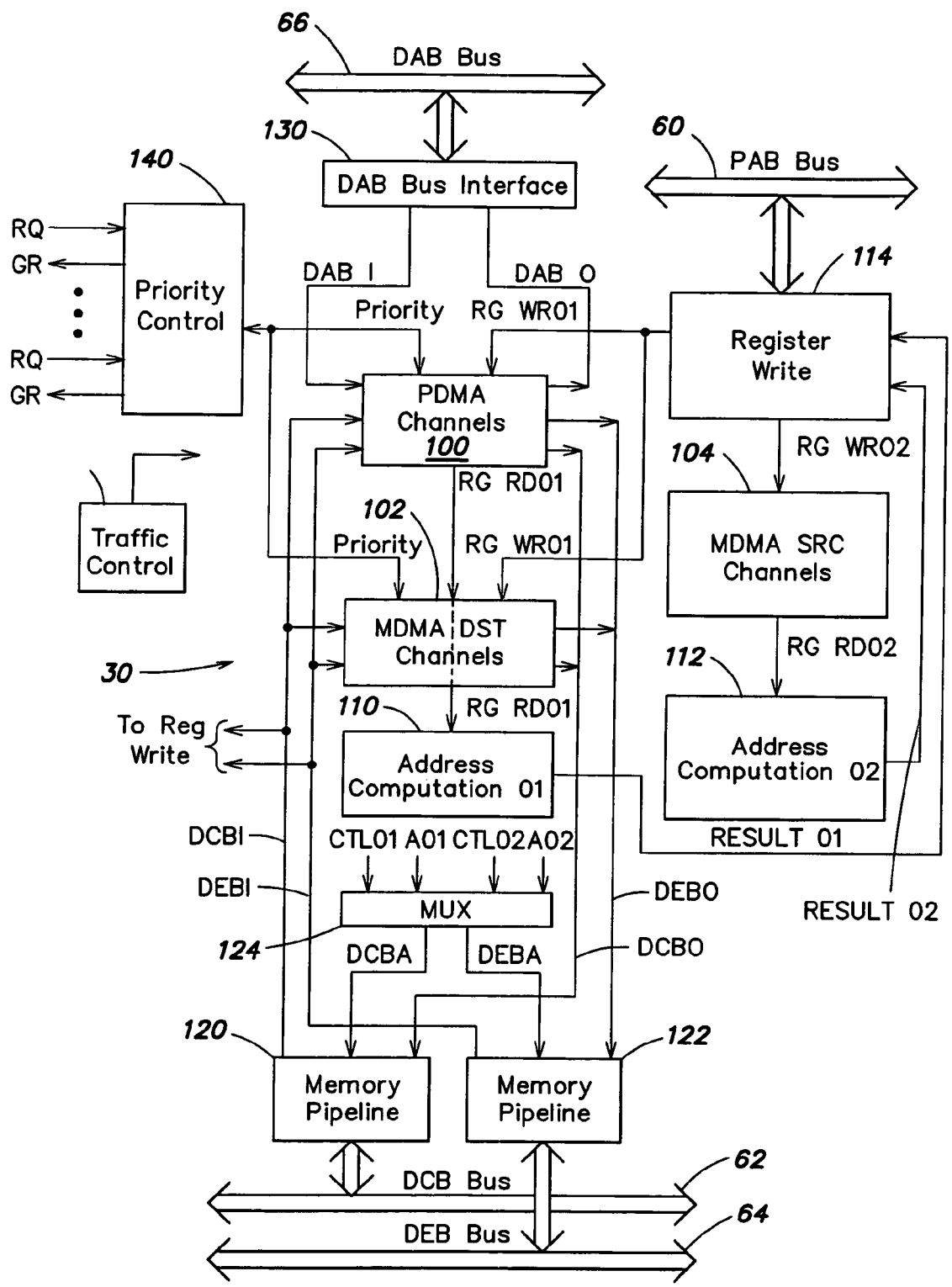
FIG. 2 is a block diagram of the DMA controller shown in FIG. 1, in accordance with an embodiment of the invention.

A block diagram of DMA controller 30 in accordance with an embodiment of the invention is shown in FIG. 2. DMA controller 30 includes one or more peripheral DMA (PDMA) channels 100 and one or more memory DMA (MDMA) streams. Each MDMA stream includes an MDMA destination channel and an MDMA source channel. Thus, DMA controller 30 includes one or more MDMA destination channels 102 and one or more MDMA source channels 104. In one embodiment, DMA controller 30 includes eight PDMA channels 100 and two each of MDMA destination channels 102 and MDMA source channels 104.

DMA controller 30 further includes a first address computation unit 110 and a second address computation unit 112. Address computation unit 110 receives, on a register read bus RG RD01, DMA parameters involved in address computation from register files in PDMA channels 100 and MDMA destination channels 102. Address computation unit 112 receives, on a register read bus RG RD02, DMA parameters involved in address computation from register files in MDMA source channels 104. The results of computations by address computation units 110 and 112 are supplied to a register write unit 114 on result buses Result 01 and Result 02, respectively.

DMA controller 30 further includes a first memory pipeline 120 coupled to DCB bus 62 and a second memory pipeline 122 coupled to DEB bus 64. As shown in FIG. 1, DCB bus 62 provides access to on-chip memory, including L1 instruction memory 12 and L1 data memory 14, via bus interface unit 20. DEB bus 64 provides access to external memory via external port 32. Referring again to FIG. 2, memory pipeline 120 is coupled by a bus DCBA to a multiplexer 124 and memory pipeline 122 is coupled by a bus DEBA to multiplexer 124. Multiplexer 124 combines memory address A01 and control signals CTL01 and combines memory address A02 and control signals CTL02. The combined signals are routed by multiplexer 124 to memory pipelines 120 and 122 in accordance with a selection signal. Thus, for example, address A01 and control signals CTL01 may be routed on one of buses DCBA and DEBA, and, on the same cycle, address A02 and control signals CTL02 may be routed on the other bus. It will be understood that one or both of memory pipelines 120 and 122 may be active at a given time.

Memory pipeline 120 supplies data input DCBI to PDMA channels 100 and MDMA destination channels 102. As described below the data is stored in a data FIFO in the appropriate channel. Memory pipeline 120 receives data output DCBO from PDMA channels 100 and MDMA destination channels 102. In addition, memory pipeline 122 supplies data input DEBI to PDMA channels 100 and MDMA destination channels 102 and receives data output DEBO from PDMA channels 100 and MDMA destination channels 102.

A DAB bus interface 130 is coupled to DAB bus 66. As noted above, DAB bus 66 carries DMA transfers to and from peripheral ports 40, 42, 44, and 46. Bus interface 130 supplies data input DABI to PDMA channels 100 and receives data output DABO from PDMA channels 100.

As shown in FIG. 2, register write unit 114 is coupled to PAB bus 60. Memory data inputs DCBI and DEBI are also coupled to register write unit 114. Register write unit 114 writes to register files in PDMA channels 100 and MDMA destination channels 102 on a register write bus RG WR01 and writes to register files in MDMA source channels 104 on a register write bus RG WR02. Thus, DMA parameters may be read from memory and written by register write unit 114 into an appropriate register file in PDMA channels 100, MDMA destination channels 102 or MDMA source channels 104. DMA parameters may also be supplied from peripheral ports 40, 42, 44, and 46 via DAB bus 66 and the DABI bus to register write unit 114. Operation of the register files is discussed in greater detail below. In addition, core processor 10 can supply DMA parameters to DMA controller 30 via PAB bus 60 and register write unit 114.

DMA controller 30 further includes a priority control unit 140. In general, priority control unit 140 arbitrates between different DMA requests for use of the resources of the DMA controller 30. The priority control unit 140 is discussed in detail below.

DMA controller 30 may include a traffic control unit 150. The traffic control unit 150 is configured to avoid frequent changes in transfer direction on DCB bus 62, DEB bus 64 and DAB bus 66. By avoiding frequent changes in transfer direction, aggregate DMA transfer bandwidth is increased. The traffic control unit 150 is discussed in detail below.

The DMA controller 30 of FIG. 2 can perform different DMA operations. Data can be transferred from peripheral ports 40, 42, 44, and 46 via DAB bus 66 and DAB bus interface 130 to one of PDMA channels 100. The peripheral data can then be routed via memory pipeline 120 or memory pipeline 122 to a desired memory location. Similarly, data can be read from a desired memory location and transferred via memory pipeline 120 or memory pipeline 122 to one of PDMA channels 100. The data is then transferred from the PDMA channel through DAB bus interface 130 and DAB bus 66 to the appropriate peripheral port. In memory-to-memory transfers, read data is received through one of the memory pipelines 120 or 122 and routed to one of MDMA destination channels 102. The source of the memory read is specified by one of the MDMA source channels 104. The data is then supplied by the MDMA destination channel to any of memory pipelines 120 or 122 for writing in the desired destination. Thus, for example, data may be transferred from external memory to internal memory for processing and results may be transferred from internal memory to external memory after processing. For another example, data may be transferred from one external memory location to another external memory location corresponding to an externally-connected memory-mapped device.

Figure 3:
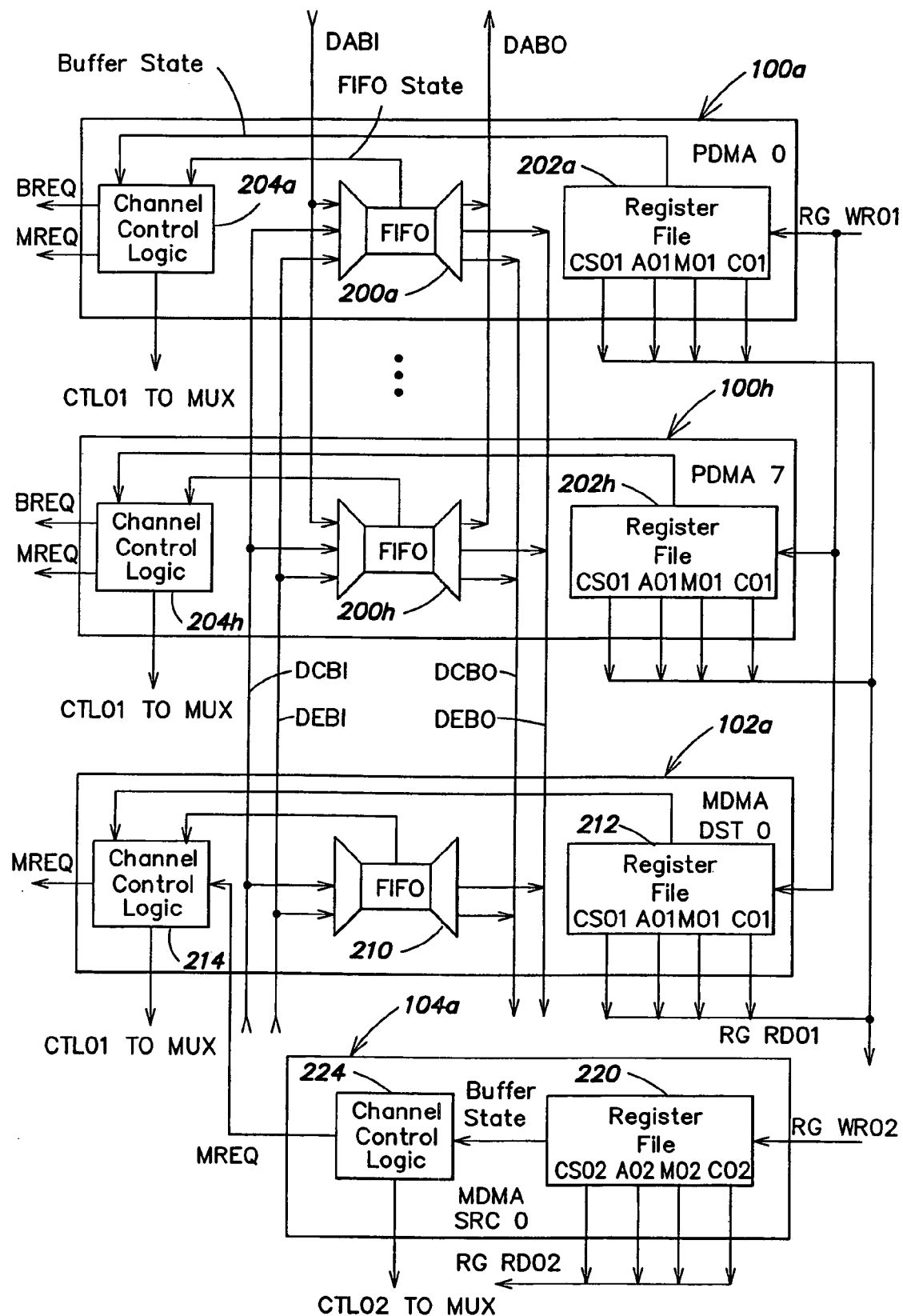
FIG. 3 is a block diagram of the PDMA channels and NDMA channels shown in FIG. 2, in accordance with an embodiment of the invention.

Details of the DMA channels are shown in FIG. 3. In FIG. 3, PDMA channels 100a and 100h are shown. As noted above, one implementation includes eight PDMA channels 100. Each PDMA channel includes a data FIFO, a register file and channel control logic. Thus, PDMA channel 100a includes a data FIFO 200a, a register file 202a and channel control logic 204a. PDMA channel 100h includes a data FIFO 200h, a register file 202h and channel control logic 204h.

Each data FIFO in the PDMA channels receives data input DCBI from memory pipeline 120 (FIG. 2), data input DEBI from memory pipeline 122 and data input DABI from DAB bus interface 130. Each data FIFO in the PDMA channels provides data output DCBO to memory pipeline 120, data output DEBO to memory pipeline 122 and data output DABO to DAB bus interface 130. The data FIFOs provide FIFO state information to the channel control logic in the respective channels. Thus, data FIFO 200a provides FIFO state information to channel control logic 204a, and data FIFO 200h provides FIFO state information to channel control logic 204h. Each data FIFO may be a 3 input/3 output random access memory in which a different input can be active on every cycle. Each data FIFO is independently controlled. Each input bus DABI, DCBI, DEBI to the set of FIFOs is independent and can transfer separate data to different channels simultaneously. Each output bus DABO, DCBO, DEBO from the set of FIFOs is independent and can transfer separate data from different channels simultaneously.

The DMA Controller 30 can perform DMA operations of various data width. Data of logical sizes 8, 16, or 32 bits may be transferred such that different DMA channels may each transfer differing data widths. In various embodiments, the physical DAB, DCB, and DEB buses are 16 bits or 32 bits in width in various combinations. All logical data sizes are supported regardless of the physical data bus widths.

When the logical data size is less than or equal to the physical DAB peripheral bus size, data is transferred LSB-adjusted on the DAB bus in a single cycle. When the logical data size is less than or equal to the physical DCB or DEB memory bus size, the data is transferred on the DCB or DEB bus in a single cycle in the byte or word position as selected by the DMA byte address, and the DMA memory access pipelines 120 and 122 adjust the data position so that it is stored LSB-aligned in the DMA channel FIFOs.

When the logical data size is greater than the physical size of the DAB, DCB, or DEB buses, then multiple bus cycles are performed in a continuous burst. For example, 32-bit logical transfers take place on a 16-bit physical DAB bus as transfers on two successive clock cycles with the Grant signal also asserted for two successive clock cycles. For a second example, 32-bit logical transfers to memory on a physical 16-bit DCB or DEB bus are performed by two memory accesses on two successive clock cycles. The address of the MSW access is calculated by the address computation unit 110 or 112 as the address of the LSW+2. The accesses may occur in any order; in one embodiment accesses are LSW first, in another embodiment accesses are MSW first.

The register file in each channel includes parameter registers, current registers and control/status registers. The values in these registers are collectively referred to as DMA parameters. In one embodiment, the DMA registers may include a link pointer to the next descriptor, the start address of the current buffer, a DMA configuration register, an inner loop count, an inner loop increment, an outer loop count (2D only), an outer loop increment, a current descriptor pointer, a current DMA address, an interrupt status register, peripheral to DMA channel mapping, a current count, and a current row count (2D only). DMA controller 30 may perform one-dimensional (1D) or two-dimensional (2D) DMA transfers in this embodiment. DMA parameters needed for address computation, including control status, address, modify and count, are supplied by a selected register file on register read bus RG RD01 to address computation unit 110 (FIG. 2). Each register file supplies buffer state information to the respective channel control logic. Thus, register file 202a supplies buffer state information to channel control logic 204a, and register file 202h supplies buffer state information to channel control logic 204h.

The channel control logic in each PDMA channel performs various channel control functions. The channel control logic provides priority and grant-enable information to the peripheral prioritizer and the memory prioritizer and provides control information to multiplexer 124 (FIG. 2) as described below. The channel control logic responds to stall information from the memory pipelines corresponding to the memory space selected by the DMA address and descriptor pointer registers. The channel control logic detects and signals interrupts on end-of-buffer or end-of-row (2D) conditions when selected by interrupt controls in the control status register. The channel control logic maintains the current state of the channel, including states indicating Stop, Pause, Descriptor Fetch, FIFO Initialization, Address Initialization, Address start-of-row initialization, and Data Transfer. The channel control logic handles detection of errors due to incorrect register accesses and due to invalid memory address.

Interrupts are synchronized with the completion of the access within the pipeline of the memories by access synchronization and acknowledgement signals, which cause memory accesses associated with interrupts to be handled and acknowledged differently by the memory and memory pipeline to guarantee system coherency. For example, writes to internal memory which are associated with an interrupt are not posted and immediately acknowledged at the input of the internal memory; instead, the acknowledgement is delayed and the upstream DMA memory pipeline is stalled until the internal memory has completed the memory write. The acknowledgement from memory releases the DMA pipeline, upon which the channel control logic is notified, at which time it signals the interrupt to the DSP. This guarantees system coherency of interrupts associated with DMA writes to memory, preventing an interrupt prior to the time when the DSP can first read correct memory data from the DMA memory destination.

Similar to the PDMA channels, MDMA destination channel 102a includes a data FIFO 210, a register file 212 and channel control logic 214. Data FIFO 210 receives data input DCBI from memory pipeline 120 (FIG. 2) and data input DEBI from memory pipeline 122. Data FIFO 210 provides data output DCBO to memory pipeline 120 and data output DEBO to memory pipeline 122. Data FIFO 210 does not receive data inputs from DAB bus 66 and does not provide data outputs to DAB bus 66. Register file 212 supplies control status information, address, modify and count information to address computation unit 110 on register read bus RG RD01.

MDMA source channel 104a includes a register file 220 and channel control logic 224, but does not include a data FIFO. DMA parameters are written into register file 220 by register write unit 114 (FIG. 2) on register write bus RG WR02, and DMA parameters needed for address computation, including control status, current address, modify and count information, are supplied by a selected register file to address computation unit 112 on register read bus RG RD02. It may be noted that register file 220 in MDMA source channel 104a is written and read separately from the register files in the PDMA channels and the MDMA destination channels. Channel control logic 224 supplies control information to multiplexer 124 and a memory request signal to channel control logic 214 in MDMA destination channel 102a.

Figure 4:
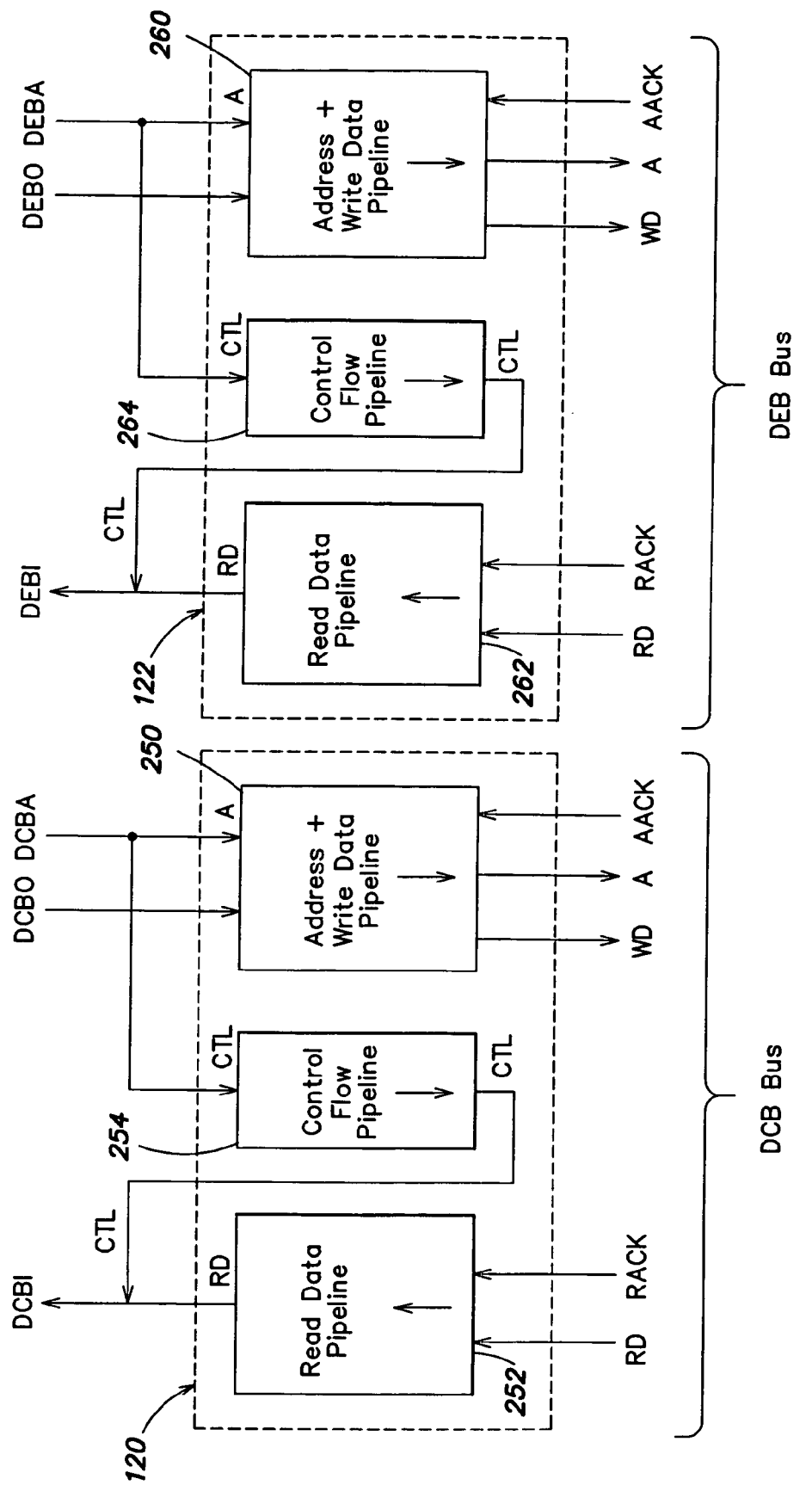
FIG. 4 is a block diagram of the memory pipelines shown in FIG. 2, in accordance with an embodiment of the invention.

A block diagram of memory pipelines 120 and 122 is shown in FIG. 4. Memory pipeline 120 includes an address and write data pipeline 250, a read data pipeline 252 and a control flow pipeline 254. Memory pipeline 122 includes an address and write data pipeline 260, a read data pipeline 262 and a control flow pipeline 264. Bus DCBA connected to multiplexer 124 (FIG. 2) is divided so that the memory address is supplied to address and write data pipeline 250 and the control information is supplied to control flow pipeline 254. Data output DCB0 from one of the PDMA channels or the MDMA destination channels is supplied to address and write data pipeline 250. The memory address A is supplied to DCB bus 62 by address and write data pipeline 250. In the case of a write access, write data is also supplied to DCB bus 62 by address and write data pipeline 250. An address acknowledge signal AACK is returned to address and write data pipeline 250 from DCB bus 62. In the case of the read access, address and write data pipeline 250 supplies a read address on DCB bus 62. The read data RD and the read acknowledge signal RACK are returned from DCB bus 62 to read data pipeline 252. The read data passes through read data pipeline 252 and is supplied on data input DCBI to one of the data FIFOs in the PDMA channels and the MDMA destination channels. The appropriate data FIFO is enabled to store the read data. The control information on bus DCBA is supplied to control flow pipeline 254. The control information passes through control flow pipeline in a timed fashion and is output from control flow pipeline 254 on the same clock cycle when the corresponding read data is output from read data pipeline 252. The read data and the control information are combined to form data input DCBI. Memory pipeline 122 operates in the same manner with respect to the DEB bus.

Figure 5:
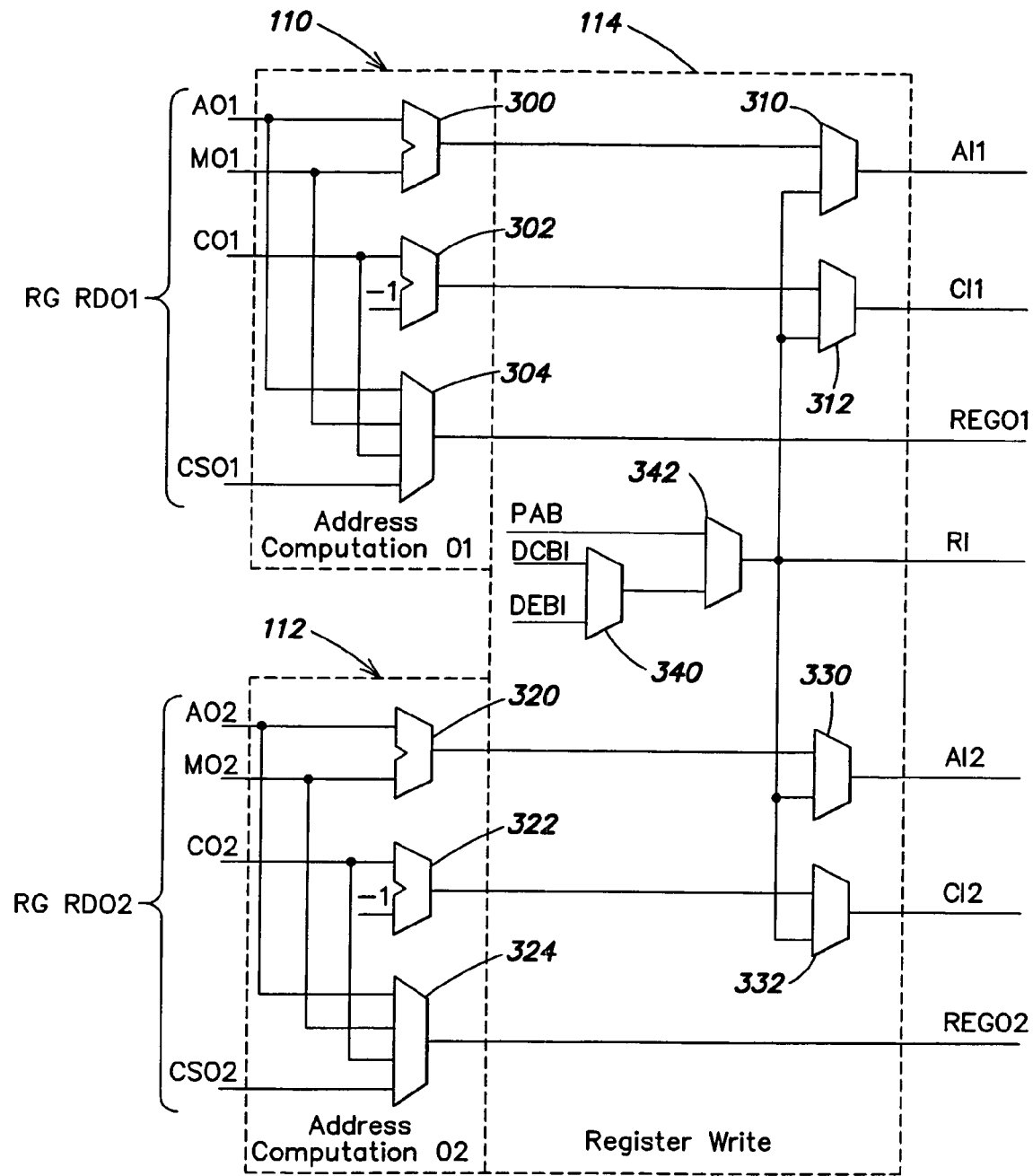
FIG. 5 is a block diagram of the address computation units and the register write unit shown in FIG. 2, in accordance with an embodiment of the invention.

A block diagram of address computation units 110 and 112, and register write unit 114 is shown in FIG. 5. Address computation unit 110 receives inputs on register read bus RG RD01 and supplies results to register write unit 114. An adder 300 sums current address A01 and modify value M01 to provide an updated address, and an adder 302 decrements current count C01 by 1 to provide an updated count value. The updated address and updated count value are supplied through data selectors 310 and 312 in register write unit 114 as address AI1 and count CI1, respectively. The updated values are written on register write bus RG WR01 to the current address and current count registers in the appropriate register file. A data selector 304 supplies the contents of a selected register file on a register output REG01 to PAB bus 60 for reading by the core processor.

Similarly, address computation unit 112 receives inputs on register read bus RG RD02 and supplies results to register write unit 114. An adder 320 sums current address A02 and modify value M02 to provide and updated address, and an adder 322 decrements current count C02 by 1 to provide an updated count value. The updated address and updated count are supplied through data selectors 330 and 332 in register write unit 114 as address AI2 and count CI2, respectively. The updated values are written on register write bus RG WR02 to the current address and current count registers in the appropriate register file. A data selector 324 supplies the contents of a selected register file on a register output REG02 to PAB bus 60 for reading by the core processor.

Address Computation units 300 and 320 perform computations in which an address and a modify value are added. In one embodiment, the data widths of the address and modify value are not the same, where the address is 32 bits wide and the modify value is 16 bits wide and is sign-extended to match the width of the address.

In one embodiment, the address computation unit 300 is 16 bits wide and performs address computations 16 bits at a time. In the first cycle, 16 LSBs of the address are added to 16 bits of a modify value and the resulting 16 LSBs of updated address are output on bus AI1 and are written back to the 16

LSBs of the channel's current address register or current descriptor pointer register. If no carry-out or borrow-out occurs, the computation is completed in this single cycle. If a carry-out or borrow-out occurs, then a second computation cycle occurs where 16 MSBs of the address are read from the register read bus RG RD01 and input to the address input of address computation unit 300, and a fixed +−1 value is presented to the modify input. The result is then output on bus AI1 and written back to the 16 MSBs of the channel's current address register. The second address computation unit 320 is also 16 bits wide and operates in a similar fashion.

As noted above, DMA descriptor information may be read from memory and supplied to register write unit 114 on data input DCBI or data input DEBI. In addition, DMA descriptor information may be received on PAB bus 60. As shown in FIG. 5, data input DCBI and data input DEBI are supplied to a data selector 340. The output of data selector 340 and inputs from the PAB bus are supplied to a data selector 342. The appropriate source of DMA descriptor information is selected, and the descriptor information is written to a selected register file on a register input bus RI. The register input bus is also supplied to data selectors 310, 312, 330 and 332 for writing current values in the register files. Preferably, the inputs from memory, including data input DCBI and data input DEBI are given priority over descriptor information on the PAB bus.

Figure 6:
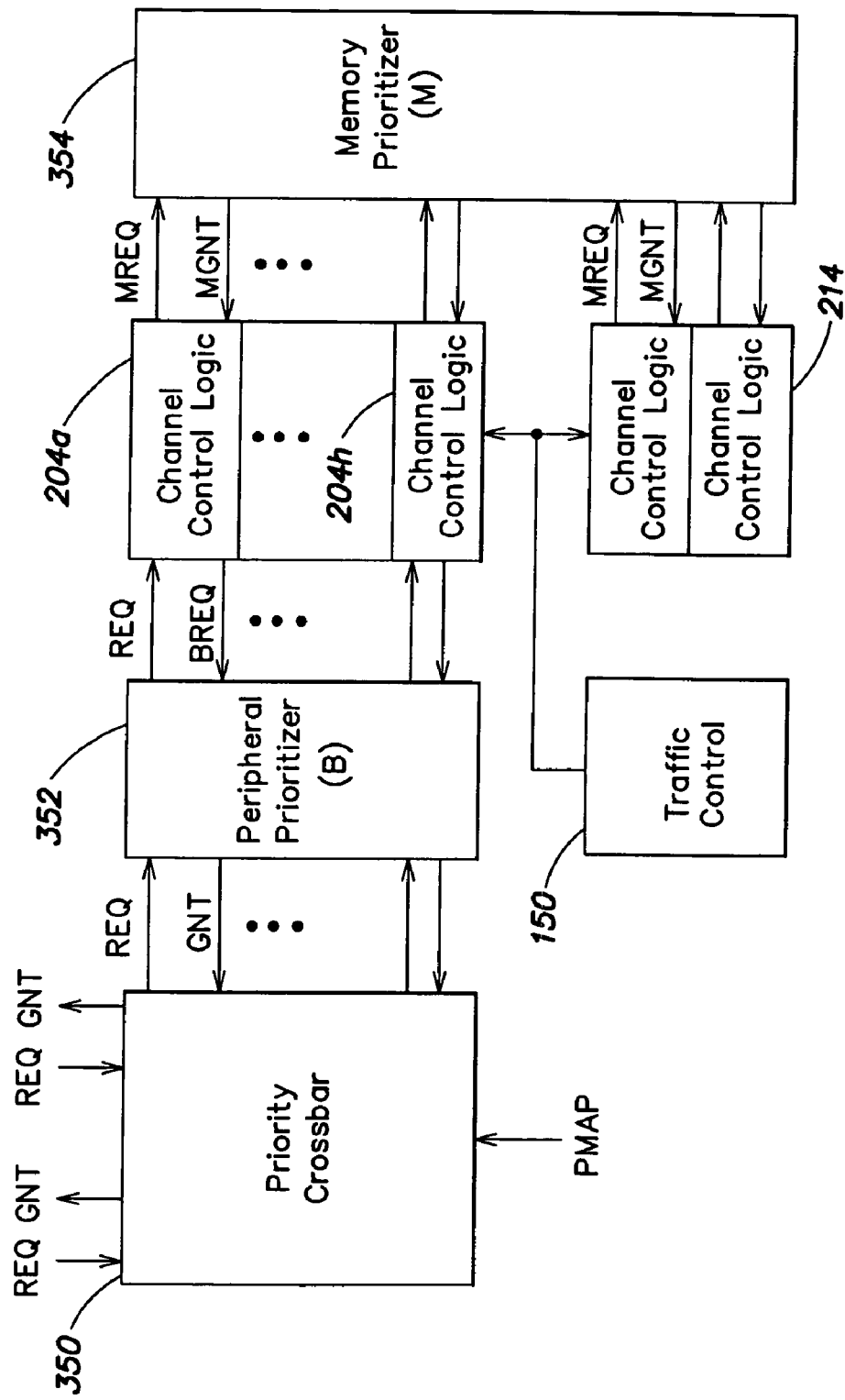
FIG. 6 is a block diagram of the priority control unit shown in FIG. 2, in accordance with an embodiment of the invention.

A block diagram of priority control unit 140 of FIG. 2 is shown in FIG. 6. Priority control unit 140 includes a priority crossbar 350, a peripheral prioritizer 352 and a memory prioritizer 354. In general, priority crossbar 350 permits a programmable priority to be assigned to each of the peripherals that have DMA capability. Priority crossbar 350 is discussed in detail below. Priority crossbar 350 is controlled by PMAP inputs from the register files in each of the PDMA channels. The PMAP inputs define a mapping between priority crossbar inputs and outputs. Peripheral prioritizer 352 and separate memory prioritizer 354 provide separate arbitration for use of the DAB bus 66 and the memory access buses 62 and 64.

A DMA request from a peripheral port is received by priority crossbar 350 and is mapped to one of the outputs of priority crossbar 350. The DMA request output by priority crossbar 350 is supplied to the channel control logic in the PDMA channel that corresponds to the priority crossbar output. The channel control logic modifies the DMA request in accordance with a traffic control mechanism described below and sends a modified request BREQ to peripheral prioritizer 352. The modified request includes a channel number, a traffic control parameter and, optionally, an urgent parameter. In one implementation, the channel number is implied from the line which is activated. The peripheral prioritizer arbitrates among modified DMA requests and grants the peripheral DMA request of highest priority, taking into consideration the traffic control parameter. The grant signal is output to priority crossbar 350. The DMA grant is mapped according to the same mapping as the corresponding DMA request and is output to a peripheral port on the appropriate grant line of priority crossbar 350.

The memory prioritizer 354 receives memory transfer requests MREQ from the channel control logic in the PDMA channels and the MDMA channels and returns grant signals MGNT to the channel control logic in the corresponding channels. The memory transfer request MREQ includes a channel number, a traffic control parameter and an urgent parameter, as discussed below. In one implementation, the channel number is implied from the line which is activated. The memory prioritizer 354 arbitrates among requests and grants the request of highest priority, taking into consideration the traffic control and urgent parameters. In particular, certain requests may be given preference in accordance with the traffic control and urgent criteria.

In the absence of priority features such as traffic control and urgent mechanisms, DMA channels are typically granted service strictly according to their priority. The priority of a channel is simply its channel number, where lower channel numbers are granted first. Thus, peripherals with high data rates or low latency requirements are assigned to lower numbered (higher priority) channels. The memory DMA streams are lower priority than the peripherals, but as they request service continuously, any time slots unused by peripheral DMA transfers are applied to memory transfers. By default, when more than one MDMA stream is enabled and ready, the highest priority MDMA stream is granted. If it is desirable for the MDMA streams to share the available bandwidth, a round robin mode may be programmed to select each MDMA stream in turn for a fixed number of transfers.

Peripherals that are requesting DMA transfers via the DAB bus 66, and whose data FIFOs are ready to handle the transfer, compete with each other for DAB bus cycles. Similarly, but separately, channels whose FIFOs need memory service compete for access to the memory buses. MDMA streams compete for memory access as a unit, and source and destination may be granted together if their memory transfers do not conflict. In this way, internal to external or external to internal memory transfers may occur at the full system clock rate. Examples of memory conflict include simultaneous access to the same memory space and simultaneous attempts to fetch descriptors. Special urgent processing may occur if a peripheral is requesting a DMA transfer but its data FIFO is not ready (for example an empty transmit FIFO or a full receive FIFO).

Traffic control is an important consideration in optimizing the use of DMA resources. Traffic control is a way to influence how often the transfer direction on the data buses may change, by automatically grouping the transfers in the same direction together. The DMA controller provides a traffic control mechanism controlled by a counter period register and a current count register. The traffic control mechanism performs the optimization without real time processor intervention and without the need to program transfer bursts into the DMA work unit streams. Traffic can be independently controlled for each of the three buses (DAB bus 66, DCB bus 62 and DEB bus 64) with simple counters.

Using the traffic control mechanism, the DMA controller preferentially grants data transfers on the DAB bus or the memory buses which are going in the same read/write direction as the previous transfer, until either the current count register reaches a limit defined by the counter period register, or until traffic stops or changes direction on its own. For example, each transfer may decrement the current count register from the value in the counter period register. When the current count register reaches 0, the preference is changed to the opposite flow direction.

In one implementation, the directional preferences operate as if the priority of the opposite direction channels were decreased by 16. For example, if channels 3 and 5 are requesting DAB bus access, but lower priority channel 5 is going with traffic and higher priority channel 3 is going against traffic, then the effective priority of channel 3 becomes 19 and channel 5 is granted access. If, on the next cycle, only channels 3 and 6 are requesting DAB bus transfers, and these transfer requests are both against traffic, then their effective priorities would become 19 and 22, respectively. Channel 3 is granted access, even though its direction is opposite to the current traffic direction. No bus cycles are wasted, other than any necessary delay required by the bus direction change.

The traffic control mechanism represents a trade-off of latency to improve utilization (efficiency). Higher counter periods may increase the length of time each request waits for its grant, but it often dramatically improves the maximum obtainable bandwidth in congested systems.

In the traffic control mechanism, each bus has a counter period register and a current count register. For each bus, the current count register shows the current cycle count remaining in the traffic period. The current count register initializes to the value in the counter period register whenever the counter period register is written or when the respective bus changes direction or becomes idle. The current count register then counts down from the counter period value to 0 on each system clock, except for DMA stalls. While this count is non-zero, same direction bus accesses are treated preferentially. When the count decrements from 1 to 0, the opposite direction bus access is treated preferentially, which may result in a direction change. When the count is 0 and a bus access occurs, the count is reloaded from the counter period register to begin a new burst.

In one embodiment, traffic control may be implemented as a two-bit mechanism which encodes three cases: no priority, prioritize reads, and prioritize writes. The control bits are sent from the traffic control unit 150 to all the channel control logic units, which accordingly modify their inputs to prioritizers 352 and 354. When reads or writes are given priority, the transfer may be increased in priority by 16, for example. Two traffic control bits are utilized in this embodiment to reduce the adverse effect of frequent changes in transfer direction. In other embodiments, additional traffic control bits may be utilized to mitigate the effect of other traffic conditions which impact performance. For example, preference may be given to consecutive accesses to the same memory page. Furthermore, different increases in priority may be utilized within the scope of the invention.

An MDMA round robin count register indicates the current count remaining in an MDMA round robin period. The current count initializes to the MDMA round robin period when the round robin period register is written, when a different MDMA stream is granted or when every MDMA stream is idle. The current count value then decrements to 0 with each MDMA transfer. When the count decrements from 1 to 0, the next available MDMA stream is selected.

Typically, DMA transfers for a given peripheral occur at regular intervals. Generally, the shorter the interval, the higher the priority that should be assigned to the peripheral. If the average bandwidth of all the peripherals is not too large a fraction of the total, then all peripheral DMA requests should be granted as required.

Occasionally, instantaneous DMA traffic may exceed the available bandwidth, causing congestion. This may occur if L1 memory or external memory is temporarily stalled, for example for an SDRAM page swap or a cache line fill. Congestion may also occur if one or more DMA channels initiates a flurry of requests, such as for descriptor fetches or to fill a FIFO in the DMA controller or in the peripheral.

If congestion persists, lower priority DMA peripherals may become starved for data. Even though the priority of the peripheral is low, if the necessary data transfer does not take place before the end of the peripheral's regular interval, system failure may result. To minimize this possibility, the DMA controller detects peripherals whose need for data has become urgent, and preferentially grants service to those peripherals at the highest priority.

A DMA request for memory service on a PDMA channel is defined as urgent if (1) the data FIFO in that channel is not ready for a DAB bus transfer (i.e. a transmit FIFO is empty or a receive FIFO is full), and (2) the peripheral is asserting its DMA request line. Descriptor fetches may be urgent, if they are necessary to initiate or continue a DMA work unit chain for a starving peripheral. In one embodiment, DMA requests from an MDMA channel are never urgent. Alternatively, the urgency of MDMA streams may be made programmable with a control bit, or may be modulated by additional control logic in response to signals from an externally connected memory-mapped device.

When one or more DMA channels have urgent memory requests, two events occur. First, all non-urgent memory requests are decreased in priority by 32, guaranteeing that only an urgent request will be granted. The urgent requests compete with each other, if there is more than one, and directional preference among urgent requests is observed. Second, the resulting memory transfer is marked for expedited processing in the targeted memory system (L1 memory or external memory) and so are all prior incomplete memory transfers ahead of the urgent memory transfer in that memory system. This may cause a series of external memory accesses by the DSP core to be delayed for a few cycles so that a peripheral's urgent request may be serviced. The preferential handling of urgent DMA transfers is automatic, and no user controls are required.

The urgent mechanism may be implemented as an urgent bit that is sent from the channel control logic to memory prioritizer 354. The urgent bit is associated with a memory access needed to service a peripheral DMA request. When the urgent bit is set, the priority of that memory access may be increased by 32, for example. A single urgent bit is used in this embodiment to limit congestion in servicing peripheral DMA requests. In other embodiments, additional urgent bits may be utilized to mitigate the effect of other congestion conditions. Furthermore, different increases in priority may be utilized within the scope of the invention.

Figure 7A:
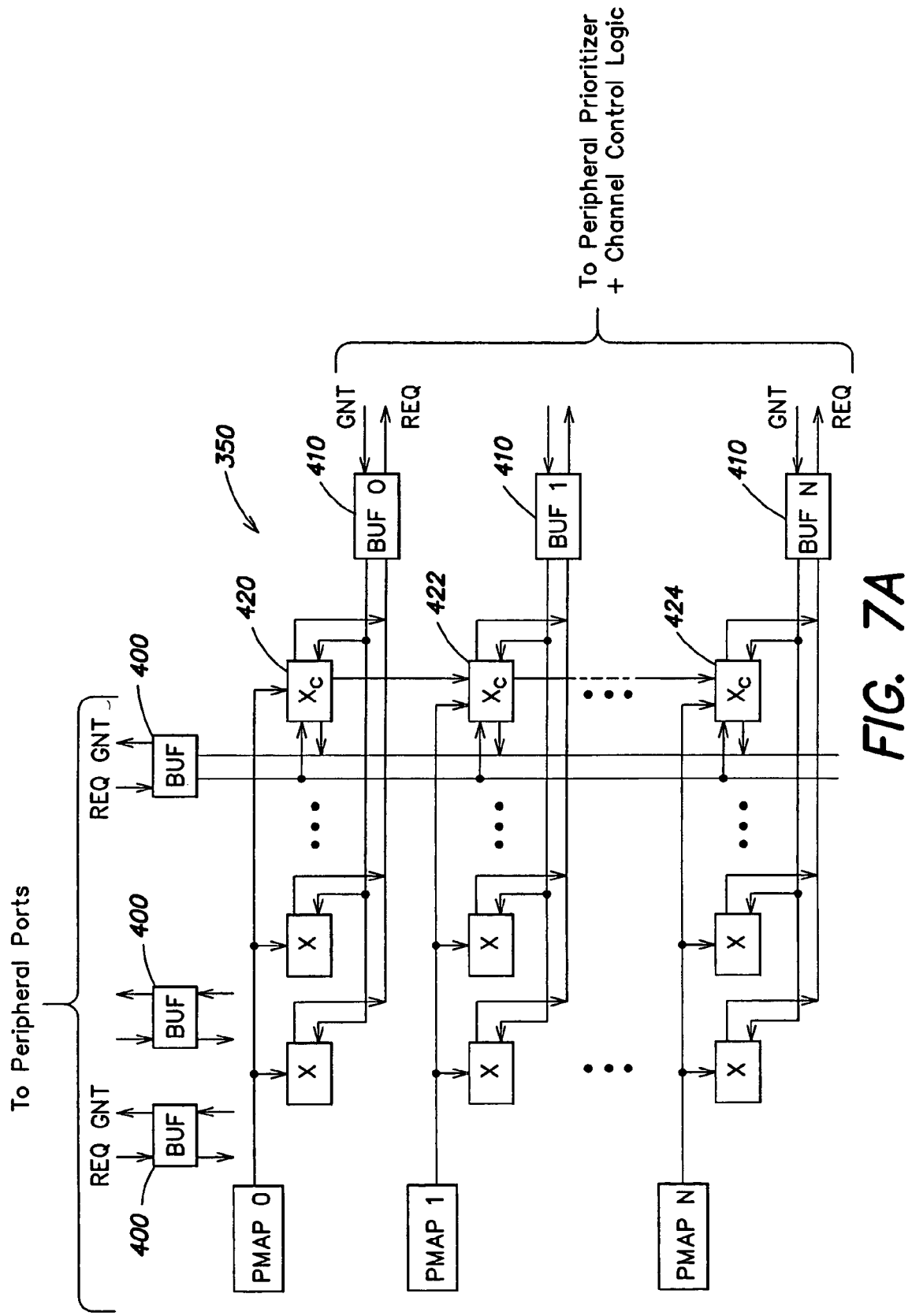
FIG. 7A is a block diagram of the priority crossbar shown in FIG. 6, in accordance with an embodiment of the invention.

A block diagram of an embodiment of priority crossbar 350 is shown in FIG. 7A. As shown, a first set of request and grant signals is coupled from the peripheral ports through buffers 400 to an array of crossbar cells, and a second set of request and grant signals is coupled from peripheral prioritizer 352 (FIG. 6) and channel control logic 204a, . . . , 204h through buffers 410 to the array of crossbar cells. The crossbar cells, such as crossbar cells 420, 422, 424 are arranged in an array of rows and columns. Each of buffers 400 is connected to the crossbar cells in a respective column of crossbar cells, and each of buffers 410 is connected to the crossbar cells in a respective row of crossbar cells. Each of the crossbar cells acts as a double pole switch, the state of which is controlled by a PMAP register value stored in one of the PDMA register files. Thus, for example, register value PMAP 0 controls the crossbar cells in a first row of the crossbar array, register value PMAP 1 controls the crossbar cells in a second row of the crossbar array, and register value PMAP N controls the crossbar cells in row N of the crossbar array.

In operation, each request and grant line from the peripheral ports is mapped to one set of request and grant lines connected to the peripheral prioritizer and channel control logic in accordance with a corresponding PMAP value. In the present embodiment, priority crossbar 350 has an 8×8 array of crossbar cells to accommodate eight PDMA channels. A conflict signal C coupled between crossbar cells 420, 422, 424 in each column is utilized with conflict resolution logic to insure that each request/grant signal pair is mapped to only one output.

Figure 7B:
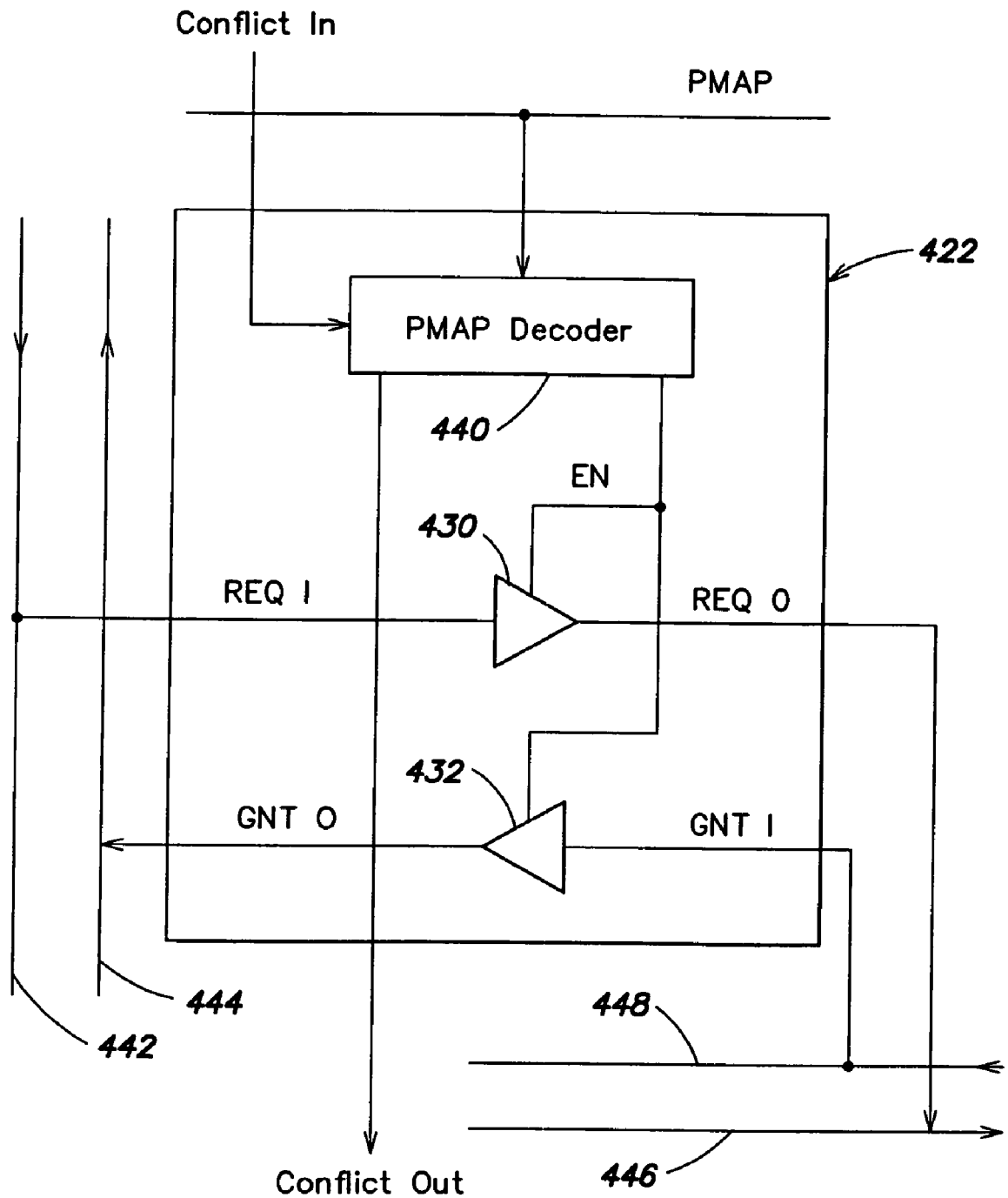
FIG. 7B is a block diagram of a representative crossbar cell shown in FIG. 7A, in accordance with an embodiment of the invention.

A block diagram of an embodiment of crossbar cell 422 is shown in FIG. 7B. As shown, crossbar cell 422 includes a logic switch 430 for controlling the request signal, a logic switch 432 for controlling the grant signal and a PMAP decoder 440 for supplying an enable signal EN to logic switches 430 and 432. When the PMAP decoder 440 identifies a match between the PMAP value and the crossbar cell, switches 430 and 432 are enabled. PMAP decoder 440 receives a conflict in signal from the previous crossbar cell in the column and provides a conflict out signal to the next crossbar cell in the column. If crossbar cell 422 is enabled, the conflict out signal inhibits all remaining crossbar cells in the same column. The crossbar cell 422 is connected to column signal lines 442 and 444 and to row signal lines 446 and 448.

DMA flex descriptors are variable-sized data structures whose contents are loaded into the register files in appropriate DMA channels. Each DMA descriptor defines a DMA transfer. In the present embodiment, the sequence of registers in the descriptor is essentially fixed among three similar variations, but the length of the descriptor is completely programmable. The DMA channel registers are ordered so that the registers that are most commonly reloaded per work unit are at the lowest addresses. The user may choose whether or not to use descriptors. If descriptors are not used, the user can write the channel registers directly to start DMA transfers and use either autobuffer mode for continuous operation or stop mode for single buffer operation.

To use descriptors, the user programs a size field NDSIZE of the DMA configuration register with the number of DMA parameter registers to load from memory. Starting with the lowest register address, the user may select a descriptor size from one entry to nine entries in this embodiment.

The variations in the descriptor value sequences depend on whether a next descriptor pointer NDPTR is included and, if so, what kind. The next descriptor pointers may include (1) none included (descriptor array mode); (2) the lower 16 bits of the next descriptor pointer (small descriptor list mode); and (3) all 32 bits of the next descriptor pointer (large descriptor list mode). The following parameters may be utilized in the different descriptor modes. The descriptor array mode may include lower and upper 16 bits of the start address, the DMA configuration register, the x count, the x modify, the y count and the y modify. The small descriptor list mode may include the lower 16 bits of the next descriptor pointer in addition to the parameters included in the descriptor array mode. The large descriptor list mode may include all 32 bits of the next descriptor pointer in addition to the parameters included in the descriptor array mode. The DMA configuration register may include a flow, or next operation, the size of the next descriptor and additional control information including, for example, data interrupt enable, data interrupt timing select, channel enable, DMA direction, transfer word size, DMA mode and DMA buffer clear. The flow bits in the configuration register may specify stop mode (flow mode 0), autobuffer mode (flow mode 1), descriptor array mode (flow mode 4), small descriptor list mode (flow mode 6) or large descriptor list mode (flow mode 7). In either of the descriptor list modes, descriptors may be chained together in a list using the next descriptor pointer.

Figure 8:
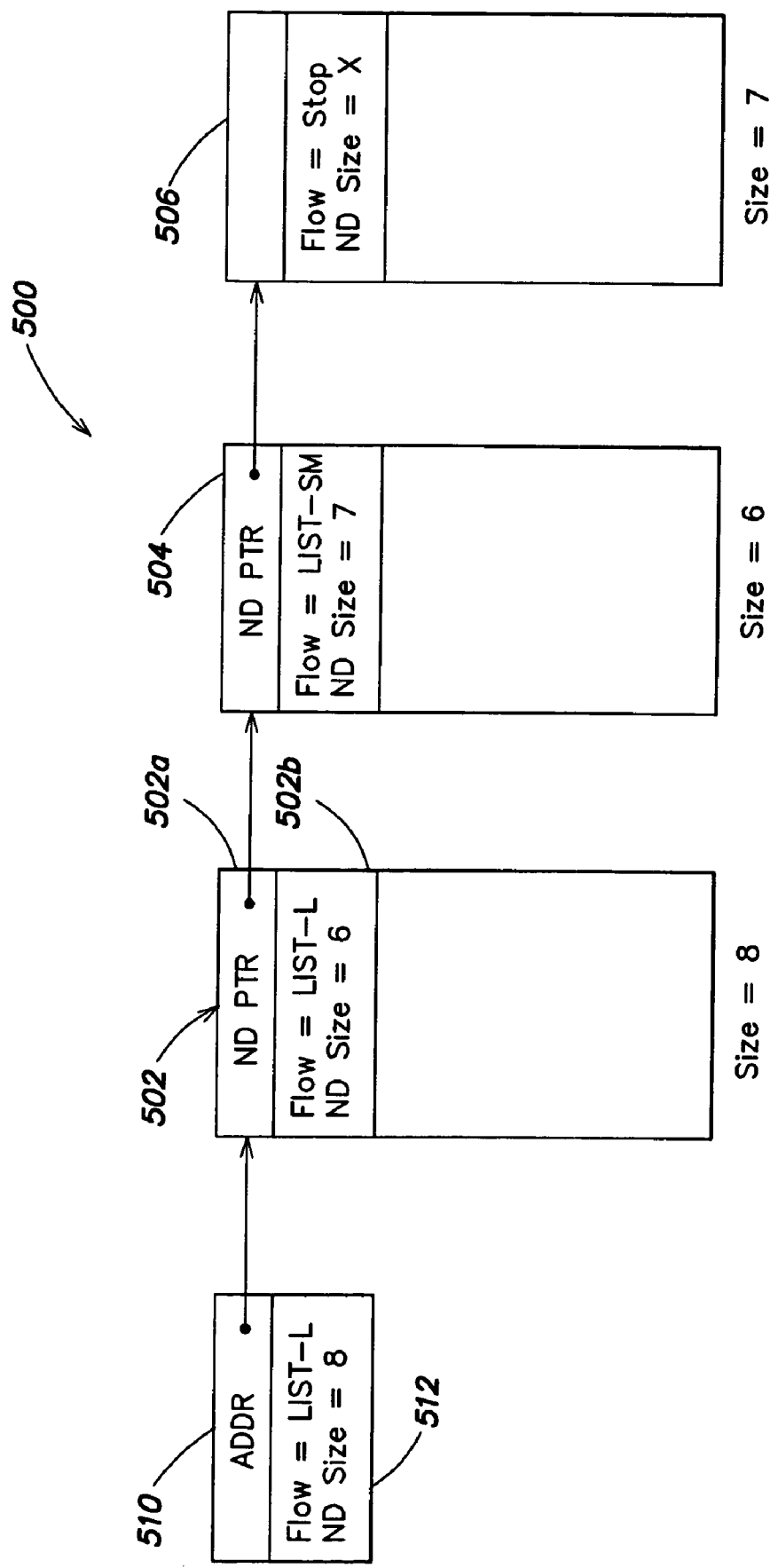
FIG. 8 is a schematic representation of flexible DMA descriptors in accordance with an embodiment of the invention.

An example of a descriptor list using DMA flex descriptors is shown in FIG. 8. A descriptor list 500 includes a first descriptor 502, a second descriptor 504 and a third descriptor 506. It will be understood that a descriptor list may include any number of descriptors, within the addressing limits of the next descriptor pointer. First descriptor 502 is defined by register settings, including an address register 510 and a configuration register 512. Address register 510 contains the start address of first descriptor 502, and configuration register 512 contains the flow, or next operation, and size of first descriptor 502. In the example of FIG. 8, first descriptor 502 indicates the large descriptor list mode and a next descriptor size of 8 words. First descriptor 502 contains a next descriptor pointer NDPTR 502a and a configuration register 502b. In the example of FIG. 8, configuration register 502b indicates the large descriptor list mode and a next descriptor size of 6 words. Similarly, each descriptor in the list includes a next descriptor pointer and a configuration register which describe the next descriptor in the list. The third descriptor 506, the last descriptor in the list, does not include a next descriptor pointer, and the configuration register indicates the stop mode. As noted above, the size of each descriptor can vary from 1 to 9 words in this embodiment. The remaining words of each descriptor are descriptor parameters, including, for example, start address, and count and modify values.

Figure 9:
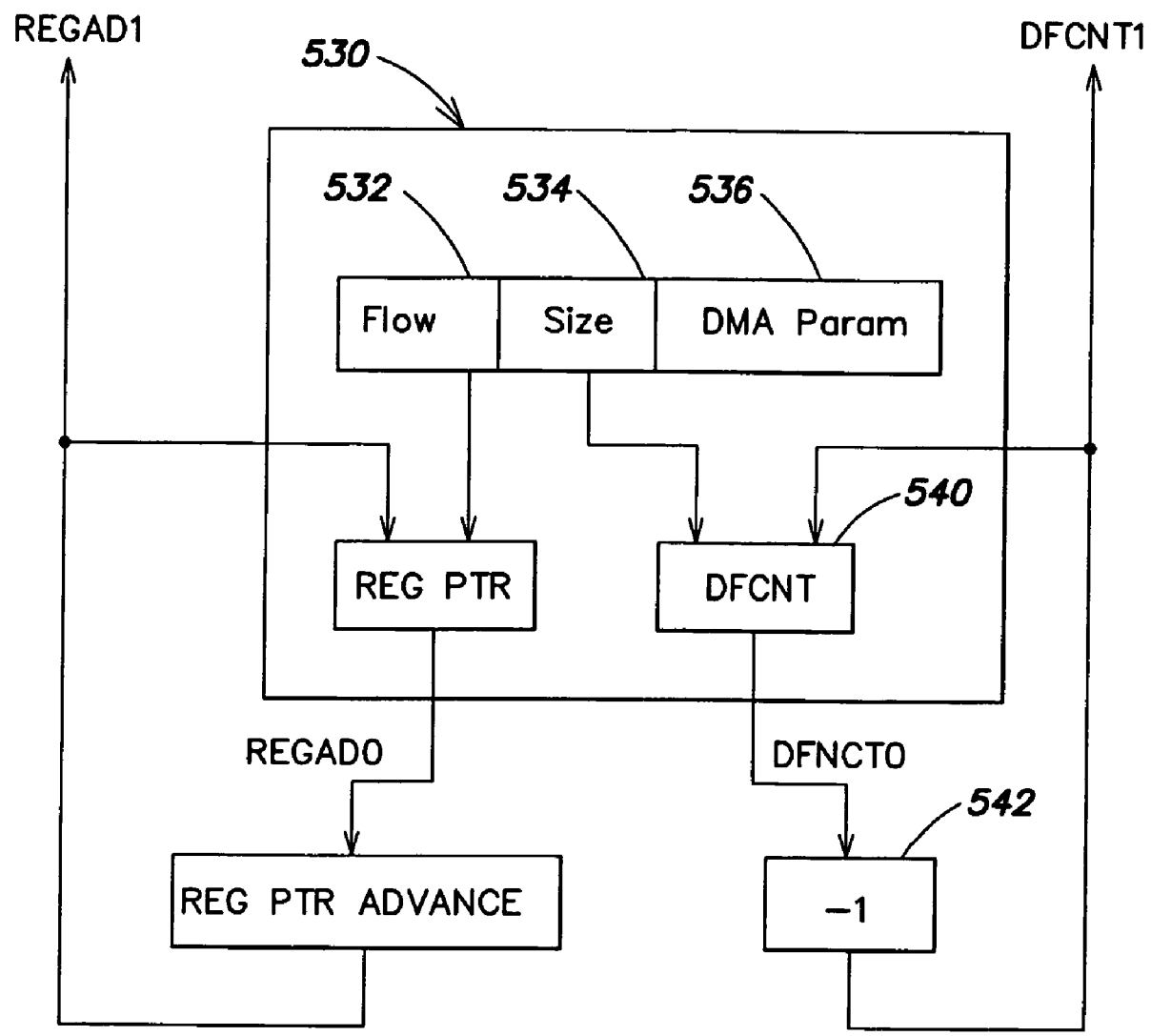
FIG. 9 is a block diagram of a descriptor controller for handling flexible DMA descriptors, in accordance with an embodiment of the invention.

A simplified block diagram of a channel descriptor controller 530 is shown in FIG. 9. The flow, size and DMA parameters are placed in registers 532, 534 and 536, respectively, in the appropriate channel. As noted above, the flow and size describe the next descriptor in the descriptor list. The size is provided from register 534 to a descriptor fetch counter 540. The flow parameter controls the initialization of the RegPtr and the sequence of values generated by successive updates to the RegPtr. For example, Flow Mode 4 causes the RegPtr to initialize so that it selects the Base Address Low register for the first transfer, while Flow Mode 7 causes the RegPtr to initialize so that it selects the Next Descriptor Pointer Low register for the first transfer. In another example, Flow Mode 6 selects the second value in the update sequence, which follows Next Descriptor Pointer Low, to select Base Address Low; thus loading a 16-bit descriptor pointer only, while Flow Mode 7 selects a different value for the second value in the update sequence, selecting Next Descriptor Pointer High followed by a third value in the update sequence selecting Base Address Low, thus loading a 32-bit descriptor pointer. After each word of the next descriptor is fetched, the descriptor fetch count is decremented by 1 in an adder 542. When the descriptor fetch count 540 reaches 0, fetching of the next descriptor is complete.

Figure 10:
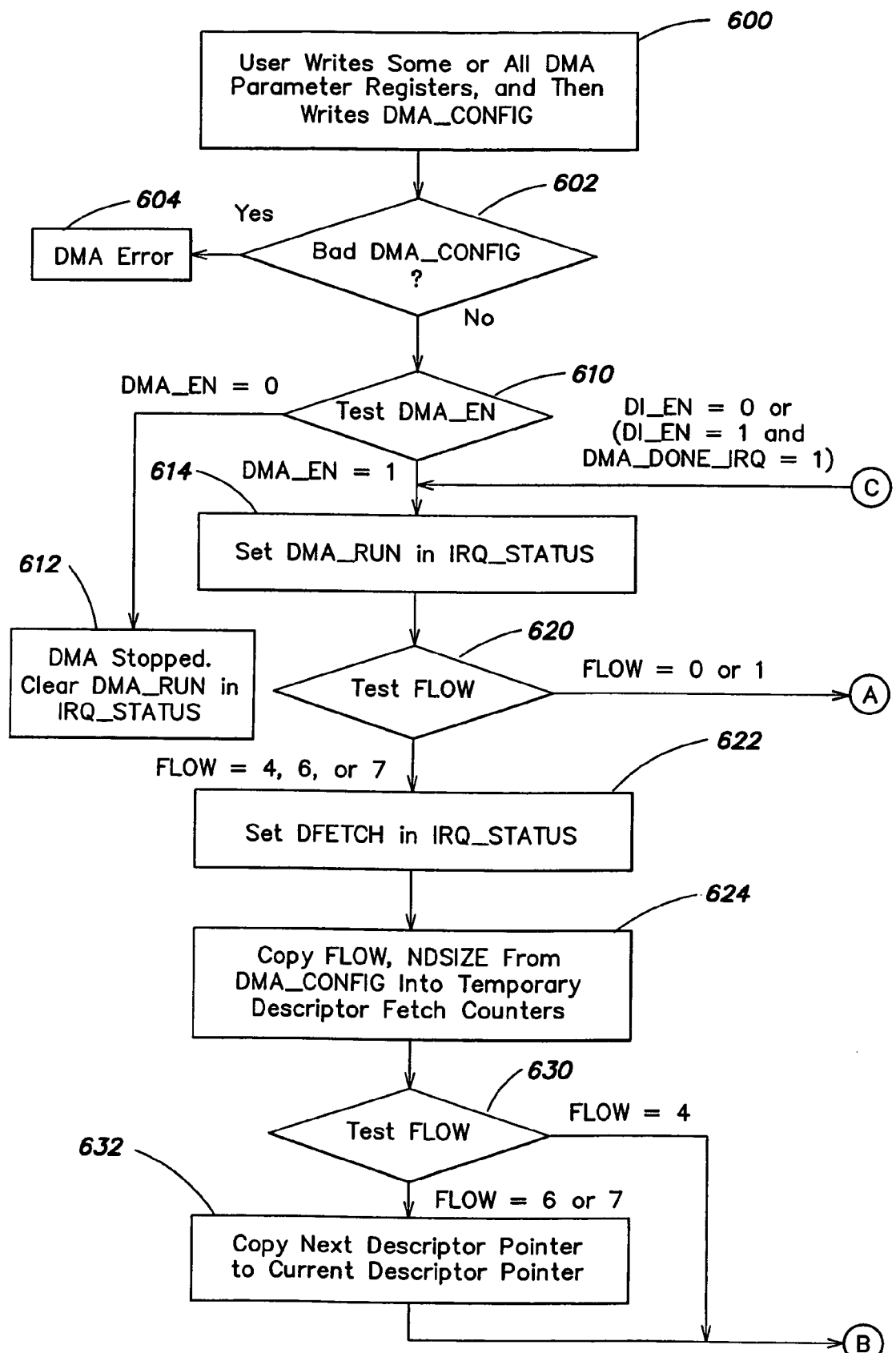
FIGS. 10 and 11 are flow diagrams of a process for performing DMA transfers in accordance with an embodiment of the invention.
Figure 11:
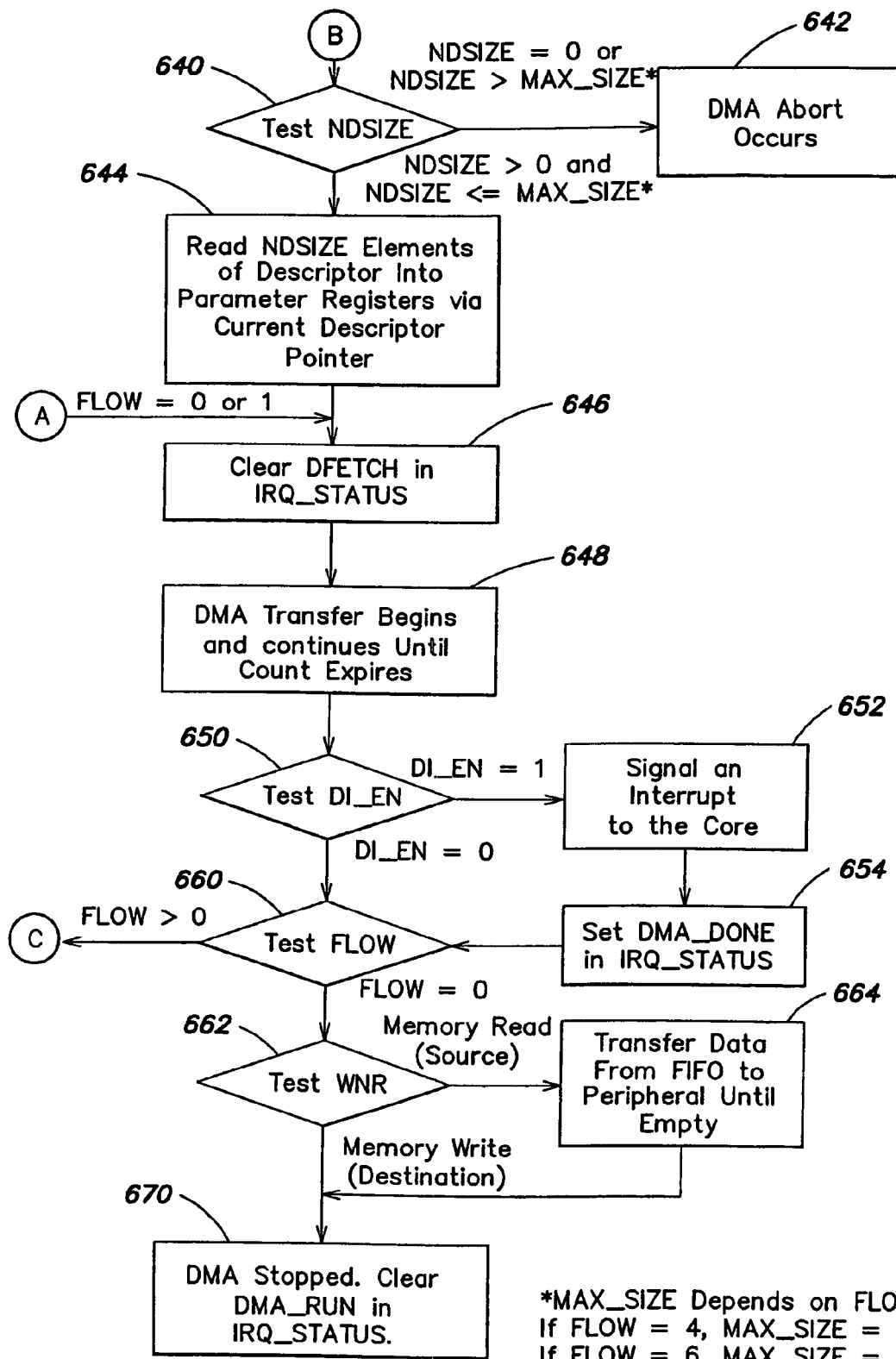

Flow diagrams of a process for performing DMA transfers in accordance with an embodiment of the invention are shown in FIGS. 10 and 11. The process may be implemented by the DMA controller 30 described herein. Referring to FIG. 10, the user in step 600 writes some or all DMA parameter registers in the register file of a selected DMA channel and then writes the DMA configuration register. In step 602, the DMA configuration register contents are tested. In the event of improper DMA configuration register information, a DMA error is generated in step 604. In step 610, the DMA channel enable bit is tested. If the DMA channel is disabled, the DMA process is stopped in step 612 and the DMA run bit is cleared in the interrupt status register. If the DMA channel is enabled, the DMA run bit is set in the interrupt status register in step 614.

In step 620, the flow bits in the configuration register are tested. The different flow modes correspond to the flow modes described above. If the flow mode bits indicate flow mode 4, 6 or 7, data fetch is set in the interrupt status register in step 622. As described above, flow mode 4 is descriptor array mode, flow mode 6 is the small descriptor list mode and flow mode 7 is the large descriptor list mode. In step 624, the flow mode and next descriptor size values are copied from the DMA configuration register into temporary descriptor fetch counters (see FIG. 9). In step 630, the flow bits are again tested. In the case of flow mode 6 or 7, the next descriptor pointer is copied to the current descriptor pointer in step 632.

The process then proceeds to step 640 shown in FIG. 11. In the case of flow mode 4 as determined in step 630, the process proceeds directly to step 640. In step 640, the next descriptor size is tested. If the next descriptor size is 0 or greater than a maximum size, a DMA abort occurs in step 642. When the next descriptor size is determined in step 640 to be greater than 0 and less than or equal to the maximum size, the descriptor elements are read into the parameter registers via the current descriptor pointer in step 644. Then the descriptor fetch bit is cleared in the interrupt status register in step 646. In the case of flow mode 0 or 1 as determined in step 620 (FIG. 10), the process proceeds directly from step 620 to step 646, since no descriptor fetch is required. Flow mode 0 is the stop mode, and flow mode 1 is the autobuffer mode.

In step 648, a DMA transfer begins and continues until the number of data elements specified by the count value or values in the descriptor has been transferred. In step 650, the data interrupt enable bit is tested. If the data interrupt enable bit is set, an interrupt is signaled to the core processor in step 652, and DMA done is set in the interrupt status register in step 654. The process then proceeds to step 660. If the data interrupt enable bit is cleared, the process proceeds directly from step 650 to step 660. In step 660, the flow mode is tested. If the flow mode is 0, a WNR bit is tested in step 662. In the case of a memory read, data is transferred from the data FIFO to the peripheral until the FIFO is empty in step 664. In the case of a memory write, or after all data has been transferred from the data FIFO, the DMA is stopped in step 670. The DMA run bit in the interrupt status register is also cleared in step 670.

In the case where the flow mode is determined in step 660 to be greater than 0, the process proceeds to step 614 (FIG. 10) for additional processing. In this case, additional descriptors are fetched from memory and additional DMA transfers are performed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention.

Accordingly, the foregoing description and drawings are by way of example only.

The invention claimed is:

1. A DMA controller comprising:
   at least one peripheral DMA channel for handling DMA transfers on a peripheral access bus;
   at least one memory DMA stream, including a memory destination channel and a memory source channel, for handling DMA transfers on first and second memory access buses;
   first and second address computation units for computing updated memory addresses for DMA transfers, wherein the first and second address computation units generate addresses at the same time to permit DMA transfer of data from one memory space to another memory space on the first and second memory access buses;
   first and second memory pipelines for supplying memory addresses to the first and second memory access buses, respectively, and for transferring data on the first and second memory access buses; and
   a multiplexer configured to supply first and second current memory addresses to selected ones of the first and second memory pipelines in response to a control signal, wherein the multiplexer supplies the first and second current memory addresses to the first and second memory pipelines at the same time.

2. A DMA controller as defined in claim 1, further comprising a peripheral prioritizer for prioritizing DMA requests for access to the peripheral access bus and a memory prioritizer for prioritizing DMA requests for access to one or both of the memory access buses.

3. A DMA controller as defined in claim 1, further comprising a traffic controller configured to give preference to consecutive transfers in one direction on one or more of the buses.

4. A DMA controller as defined in claim 1, wherein each of the peripheral DMA channels has a data FIFO wit inputs receiving data from the peripheral access bus and the memory access buses and with outputs supplying data to the peripheral access bus and the memory access buses.

5. A DMA controller as defined in claim 4, further comprising an urgent controller configured to increase the priority of a memory transfer when a peripheral DMA request is received and the data FIFO in a corresponding peripheral DMA channel is not ready to transfer data.

6. A DMA controller as defined in claim 4, wherein each of the one or more memory destination channels has a data FIFO with inputs receiving data from the memory access buses and with outputs supplying data to the memory access buses.

7. A DMA controller as defined in claim 1, wherein the multiplexer is configured to receive the first current memory address from one of the peripheral DMA channels or one of the memory destination channels and to receive the second current memory address from one of the memory source channels and to supply the first and second current memory addresses to selected ones of the memory pipelines.

8. A DMA controller as defined in claim 1, wherein each of the memory pipelines includes an address and write data pipeline for supplying memory addresses and write data to the respective buses, a read data pipeline for receiving read data from the respective buses and a control flow pipeline for controlling the flow of control information during a memory access.

9. A DMA controller as defined in claim 1, wherein the DMA controller is programmable to transfer data from the peripheral access bus through the at least one peripheral DMA channel and one of the memory pipelines to one of the memory access buses, to transfer data from one of the memory access buses through one of the memory pipelines and the at least one peripheral DMA channel to the peripheral access bus and to transfer data from one memory location to another memory location, through the memory source channel and the memory destination channel, between the first and the second memory access buses.

* * * * *